United States Patent
Ludwig et al.

(10) Patent No.: US 10,176,380 B1
(45) Date of Patent: Jan. 8, 2019

(54) TRAINABLE VERSATILE MONITORING DEVICE AND SYSTEM OF DEVICES

(71) Applicant: Xevo Inc., Bellevue, WA (US)

(72) Inventors: John Ludwig, Bellevue, WA (US); Richard Tong, Seattle, WA (US); Jonathan Anderson, Seattle, WA (US); John Zagula, Seattle, WA (US)

(73) Assignee: Xevo Inc., Bellevue, WA (US)

( * ) Notice: Subject to any disclaimer, the term of this patent is extended or adjusted under 35 U.S.C. 154(b) by 0 days.

(21) Appl. No.: 15/627,324

(22) Filed: Jun. 19, 2017

Related U.S. Application Data

(62) Division of application No. 14/242,837, filed on Apr. 1, 2014, now Pat. No. 9,684,834.

(60) Provisional application No. 61/806,967, filed on Apr. 1, 2013.

(51) Int. Cl.
| | |
|---|---|
| *H04N 7/00* | (2011.01) |
| *G06K 9/00* | (2006.01) |
| *G06K 9/20* | (2006.01) |
| *H04N 7/18* | (2006.01) |
| *G08C 17/02* | (2006.01) |

(52) U.S. Cl.
CPC ......... *G06K 9/00677* (2013.01); *G06K 9/209* (2013.01); *G06K 9/2081* (2013.01); *G08C 17/02* (2013.01); *H04N 7/181* (2013.01); *G06K 2009/2045* (2013.01)

(58) Field of Classification Search
CPC .......................... H04N 7/18; G08B 13/19615
See application file for complete search history.

(56) References Cited

U.S. PATENT DOCUMENTS

| | | | | |
|---|---|---|---|---|
| 8,417,090 B2* | 4/2013 | Fleming | ................... | H04N 5/77 386/226 |
| 8,457,879 B2* | 6/2013 | Merkel | ................... | G01C 21/20 340/541 |
| 2003/0078696 A1* | 4/2003 | Sakamoto | ................ | A63H 3/52 700/245 |
| 2005/0237187 A1* | 10/2005 | Martin | ............. | G08B 13/19645 340/541 |
| 2006/0268108 A1* | 11/2006 | Abraham | ........... | G08B 13/1968 348/143 |
| 2007/0153091 A1* | 7/2007 | Watlington | ............... | H04N 7/15 348/208.14 |
| 2008/0273754 A1* | 11/2008 | Hick | ................... | G06K 9/00771 382/103 |
| 2009/0077167 A1* | 3/2009 | Baum | ................ | G06F 17/30017 709/203 |
| 2009/0122144 A1* | 5/2009 | Latham | ............. | G08B 13/19632 348/155 |
| 2009/0195655 A1* | 8/2009 | Pandey | ............ | G08B 13/19647 348/158 |
| 2010/0128123 A1* | 5/2010 | DiPoala | ........... | G08B 13/19619 348/143 |

(Continued)

*Primary Examiner* — Frank F Huang

(57) ABSTRACT

A machine system includes monitor devices each having a camera, the monitor devices distributed over a physical area; layout logic forms images from the cameras of the monitor devices into a scene layout for the area; user interface logic receives training signals from sensors directed to a person physically present in the area and to correlate those signals to subareas of the layout; and analytical logic analyzes the layout and training signals to ascertain subareas of the area at which the monitor devices should focus machine sensor and processing resources.

17 Claims, 12 Drawing Sheets

(56) References Cited

U.S. PATENT DOCUMENTS

| | | | |
|---|---|---|---|
| 2010/0312734 A1* | 12/2010 | Widrow | G06K 9/6247 |
| | | | 706/25 |
| 2011/0055747 A1* | 3/2011 | Hua | G06F 1/1632 |
| | | | 715/771 |
| 2011/0181716 A1* | 7/2011 | McLeod | H04N 7/181 |
| | | | 348/143 |
| 2012/0019659 A1* | 1/2012 | Warzelhan | G08B 13/19615 |
| | | | 348/143 |
| 2012/0323364 A1* | 12/2012 | Birkenbach | G06F 3/014 |
| | | | 700/257 |

* cited by examiner

TRAINABLE VERSATILE MONITORING DEVICE AND SYSTEM OF DEVICES

PRIORITY CLAIM

The present application claims priority under 35 U.S.C. 119 to U.S. application Ser. No. 61/806,967, filed on Apr. 1, 2013, which is incorporated herein by reference in its entirety.

BACKGROUND

Today, home and commercial security employs numerous diverse and uncoordinated systems, such as wired home security systems, smoke alarms, WiFi access points, and webcams. Wired security systems require installation of detectors at each window and door, or very narrow range sensors such as glass break sensors. They require touch pad entry rather than using visual user interface in each room. Smoke alarms are simple devices that cannot differentiate complex situations. So for instance a smoke alarm often cannot detect that there is no fire, but actually a candle on a cake causing heat and smoke. WiFi access points provide wireless network access only and do not monitor systems. Webcams allow primitive viewing but do not interpret intelligently using face and object recognition and are not part of a larger integrated system.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

Preliminaries

Figure 1:
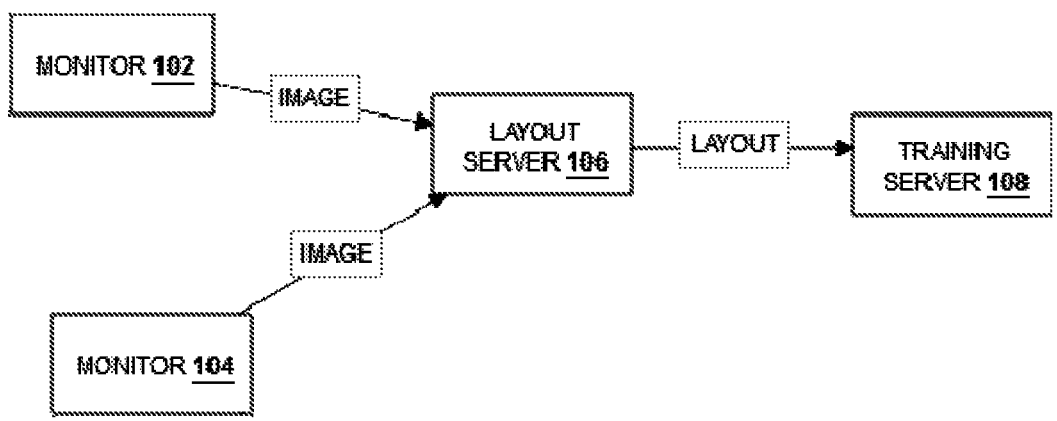
FIG. 1 is a system diagram of an embodiment of a versatile monitoring system.

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

"Logic" refers to machine memory circuits, machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic may vary according to implementation.

'WiFi' in this context refers to technology that allows an electronic device to exchange data wirelessly (for example, using radio waves) over a computer network, including Internet connections. WiFi can refer to wireless local area network (WLAN) communication logic and techniques that are based on the Institute of Electrical and Electronics Engineers' (IEEE) 802.11 standards.

'BlueTooth' in this context refers to standard IEEE 802.15.1, is a wireless technology standard for exchanging data over short distances (using short-wavelength radio transmissions in the ISM band from 2400-2480 MHz) from fixed and mobile devices, creating for example personal area networks with levels of security.

'Ethernet' in this context refers to a family of computer networking technologies for local area networks (LANs). The Ethernet standards comprise several wiring and signaling variants of the OSI physical layer. Ethernet may operate over physical transmission media including coaxial cables, twisted pair, and fiber optic. Ethernet divides a stream of data into shorter pieces called frames. Each frame contains source and destination addresses and error-checking data so that damaged data can be detected and re-transmitted. As per the OSI model Ethernet provides services up to and including the data link layer.

'Z-Wave' in this context refers to a wireless communications protocol designed for home automation, specifically to remotely control applications in residential and light commercial environments. The technology uses a low-power RF radio embedded or retrofitted into home electronics devices and systems, such as lighting, home access control, entertainment systems and household appliances. Z-Wave communicates using a low-power wireless technology designed for remote control applications. The Z-Wave wireless protocol provides reliable, low-latency communication of small data packets. Z-Wave operates in the sub-gigahertz frequency range, around 900 MHz.

'RFID' in this context refers to (radio-frequency identification), a wireless non-contact system that uses radio-frequency electromagnetic fields to transfer data from a self-contained tag attached to an object. Some tags require no intrinsic power source and are powered and read at short ranges via magnetic fields (electromagnetic induction). Others use an intrinsic or local power source and emit radio waves (electromagnetic radiation at radio frequencies). The tag contains electronically stored information which may be read from a short distance away. The tag does not need to be within line of sight of the reader and may be embedded in the tracked object.

'Synchronize' in this context refers to operating in unison, so that the operation or occurrence of one component or signal is timed to take place at or close to the operation or occurrence of another component or signal.

'Monitor' in this context refers to measuring or recording on an ongoing or recurring basis for a specific purpose.

'Configure' in this context refers to setting up for operation in a particular way.

'Integrate' in this context refers to forming, coordinating, and/or blending into a functioning and unified whole.

'Mechanism' in this context refers to a process, technique, device, or system of devices for achieving a result.

'Biometric' in this context refers to a measurement and analysis of a unique physical or behavioral characteristic of an individual, as a mechanism of verifying the individual's identity.

'Coordinate' in this context refers to a process or configuration of bringing objects or signals into a common action or condition.

'Process (Data)' in this context refers to (data processing) any process that utilizes device logic to manipulate signals representing numeric values or symbols into control signals to a circuit, output device, or communication media. Data processing may involve recording, analyzing, sorting, summarizing, calculating, disseminating and storing electrical, optical, or magnetic signals representing numbers or symbols. Data-processing devices and systems of devices typically manipulate data signals to alter the material configuration of machine memory devices or the behavior of circuits or output devices.

'Resource (Device)' in this context refers to any physical or virtual component of limited quantity and/or availability within a device. Every device connected to a computer system is a resource. Every internal system component is a resource. Virtual system resources of data processing devices include files, network connections and memory areas.

'Microphone' in this context refers to an acoustic-to-electric transducer or sensor that converts sound into an electrical signal. Many microphones use electromagnetic induction (dynamic microphone), capacitance change (condenser microphone), piezoelectric generation, or light modulation to produce an electrical voltage signal from mechanical vibration.

'Camera' in this context refers to a device that records images and/or video, either as analog or as digital information signals.

'Image' in this context refers to information captured and stored by a device representing a visual perception, usually a two-dimensional picture. Images may be captured, stored, and communicated by devices in either analog or digital formats.

'Video' in this context refers to information captured and stored by a device representing a sequence of moving pictures. Video may be captured, stored, and communicated by devices in either analog or digital formats.

'Stereo' in this context refers to sound reproduction that creates directionality and audible perspective by using two or more independent audio channels through a configuration of two or more speakers in such a way as to create the impression of sound heard from various directions, as in natural hearing. 'speaker' in this context refers to an electroacoustic transducer that produces sound in response to an electrical or optical audio signal input.

'Motion detector' in this context refers to a device that detects moving objects, often people. A motion detector includes a motion sensor that transforms input signals indicative of motion in the field of view into an electric signal. This may be achieved by measuring optical changes in the field of view 'Magnetometer' in this context refers to a device used to measure the strength and, in some cases, the direction of magnetic fields.

'LED' in this context refers to (light emitting diode) a semiconductor light source including one or more diodes that when biased release energy in the form of photons.

'Backhaul' in this context refers to the intermediate links between a network and devices on the edge of the network (i.e., leaf nodes of the network). Backhaul may refer to the portions of a local or intermediate network (e.g., Internet Service Provider) that communicate with the global Internet.

'Mesh network' in this context refers to a type of device network where each node (device) must not only input, store, and disseminate its own data, but also serve as a relay for other nodes. That is, each device that acts as a node in a mesh network must collaborate to propagate data communicated from other nodes in the network.

'Modem' in this context refers to (modulator-demodulator) a device that modulates an analog carrier signal to encode digital information, and also demodulates such a carrier signal to decode the transmitted information.

'Phone line' in this context refers to a circuit on a telephone communication system, typically referring to the physical wire or other signaling medium connecting or capable of connecting a telephone device to the telecommunications network, and usually associated with a telephone number for addressing communications to and from the connected telephone.

'Cable (Line)' in this context refers to a physical media for distributing data, audio streams, and video streams to end devices in homes and offices via radio frequency (RF) signals transmitted (typically) through coaxial cables or light pulses through fiber-optic cables.

'AC power' in this context refers to (alternating current) a form of delivering electric energy in which the flow of electric charge from the power source periodically reverses direction.

'DC power' in this context refers to (direct current) a form of delivering electric energy in which the flow of electric charge from the power source does not alternate in direction.

'Battery' in this context refers to a device comprising of one or more electrochemical cells (which may be referred to as 'stages') that convert stored chemical energy into electrical energy.

'Power line' in this context refers to a physical media (transmission media) used to transmit electrical or other forms of energy from a power source to a power consumer.

'Cellular (Device)' in this context refers to a device that can place and receive voice communication calls, and typically also communicate non-voice data, over a radio link while moving around a wide geographic area. Cellular devices connect to a cellular network provided by a cellular system operator (e.g., a phone company), allowing access thereby to the public (wired communication) telephone network and usually to the global Internet as well.

'Peer-to-peer' in this context refers to a device network in which each device acting as a node in the network may act as a client or server for the other nodes in the network, allowing shared access to various resources such as files, peripherals, and sensors without necessarily utilizing a central server device.

'Audio' in this context refers to a representation of sound within a device or a physical storage or communication media, typically as either analog or digital signals.

'Email' in this context refers to a form of electronic or optical communications between devices, which takes the form of exchanging messages from an author to one or more recipients. Email communications typically operates across the Internet or other device networks.

'Text message' in this context refers to a form of communication involving brief messages (i.e., SMS), usually involving a cellular device as at least a source or destination of the messages, where at least a portion of the communications in transmitted over a cellular network.

'SMS' in this context refers to (short message service) a text messaging communication technique using standardized communications protocols that enable the exchange of short text messages between cellular devices.

'MMS' in this context refers to (multimedia message service) a standard way to send messages that include multimedia (e.g., voice, video, images, animation, etc.) content to and from cellular devices. MMS extends SMS to enable the exchange of messages having more and more complicated data than text messages.

'Voice mail' in this context refers to a communication technique and systems for capturing, storing, and retrieving audio information using telecommunications device networks.

'IM' in this context refers to (instant messaging) a communication technique and systems for message exchange between two or more participants over the Internet or other device networks, typically in close-to-real-time.

'IP' in this context refers to (Internet Protocol) a primary protocol in the Internet protocol suite designed to enable delivery of data packets from a source device to a destination device based on an address (i.e., an IP address). IP defines datagram structures that encapsulate the data to be delivered. It also defines addressing mechanisms to identify the datagram source and destination devices.

'FTP' in this context refers to (File Transfer Protocol) a standard network protocol to enable the transfer of files (collections of data that may be stored, referenced, and manipulated as a unit) from one device or to another device over a TCP-based network, such as the Internet.

'TCP' in this context refers to (Transmission Control Protocol) a primary protocol of the Internet protocol suite, enabling reliable, ordered delivery of a stream of octets from one device to another over device networks, such as the Internet.

'Web site' in this context refers to a set of one or more web pages served from a single web domain. A web site is presented for access by external devices by at least one web server, and accessible via a network such as the Internet or a private local area network through an Internet address known as a Uniform Resource Locator.

'URL' in this context refers to (Uniform Resource Locator) a character string that comprises a reference to a network resource, typically one that is accessible to a web browser via an interaction with a web server.

'Web page' in this context refers to a file configured for access and display via a web browser over the Internet, or Internet-compatible networks.

'Web browser' in this context refers to logic for retrieving, presenting and traversing information resources on the World Wide Web. An information resource is identified by a Uniform Resource Identifier (URI) and may be a web page, image, video or other piece of content. Hyperlinks present in resources enable users easily to navigate their browsers to related resources. A web browser can also be defined as an application software or program designed to enable users to access, retrieve and view documents and other resources on the Internet.

'Web server' in this context refers to a device or device system that delivers web pages in response to requests for the web pages from web browsers.

'Web domain' in this context refers to an Internet Protocol (IP) resource, such as a personal computer used to access the Internet, a web server computer hosting a web site, the web site itself, or any other service communicated via the Internet.

'RSS' in this context refers to (Really Simple Syndication) a family of data formats and techniques to publish frequently updated works of authorship. An RSS document (which is called a "feed", "web feed", or "channel") may include full or summarized text, plus metadata such as publishing dates and authorship.

'Primary (power)' in this context refers to a source from among multiple sources of power to a device that is used first or most often to provide the device with operational power.

'Backup (power)' in this context refers to a source from among multiple sources of power to a device that is used when the primary power source fails or is otherwise unavailable to provide the device with operational power.

'Cloud (Network)' in this context refers to device resources delivered as a service over a network (typically the Internet).

'API' in this context refers to (Application Programming Interface) a protocol for interfacing to and invoking functions and data of logic components. For example, an API may include specification for logic procedures (functions, routines), data structures, object classes, and variables.

'UV' in this context refers to (ultraviolet) electromagnetic radiation with a wavelength shorter than that of visible light, but longer than X-rays, that is, in the range 10 nm to 400 nm, corresponding to photon energies from 3 eV to 124 eV.

'IR' in this context refers to (infrared) electromagnetic radiation with longer wavelengths than those of visible light, extending from the nominal red edge of the visible spectrum at 0.74 micrometers (μm) to 0.3 mm. This range of wavelengths corresponds to a frequency range of approximately 430 down to 1 THz,[1] and includes most of the thermal radiation emitted by objects near room temperature.

'RF' in this context refers to (radio frequency) a rate of oscillation in the range of about 3 kHz to 300 GHz, which corresponds to the frequency of electromagnetic radio waves, and the alternating currents which carry radio signals. RF usually refers to electrical rather than mechanical oscillations, although mechanical RF systems do exist.

Overview

A machine system includes a plurality of monitor devices each comprising a camera, the monitor devices distributed over a physical area; layout logic configured to form images from the cameras of the monitor devices into a scene layout for the area; user interface logic configured to receive training signals from sensors directed to a person physically present in the area and to correlate those signals to subareas of the layout; and analytical logic configured to analyze the layout and training signals to ascertain subareas of the area at which the monitor devices should focus machine sensor and processing resources. The system may analyze the layout and training signals for gestures by the person indicative of subareas of the area at which the monitor devices should focus machine sensor and processing resources. The system may include a web server to receive and store the layout and the training signals. The web server may include logic to combine the layout and training information into an enhanced layout and to communicate at least a portion of the enhanced layout back to each monitor unit. The user interface logic may receive training signals from the sensors representing indications by the person of movable objects to monitor for changes. The system may analyze the layout and training signals for gestures by the person indicative of movable objects to monitor for changes. The user interface logic may receive training signals from the sensors representing voice commands by the person that indicate information to associate with the subareas. The analytical logic may analyze the layout and training signals to ascertain subareas of the area at which the monitor devices should deliberately avoid focusing machine sensor and processing resources. The analytical logic may analyze the layout and training signals for gestures by the person indicative of subareas of the area at which the monitor devices should deliberately avoid focusing machine sensor and processing resources. The analytical logic may analyze the layout to determine if the area corresponds to an existing stored layout. The analytical logic may analyze the layout to determine if an area corresponding to an existing scene layout includes unfamiliar geometry or unfamiliar objects. The analytical logic may analyze the layout each time a monitor device is moved to a new area to determine if the area corresponds to an existing stored layout. The user interface logic may receive from the person names to objects represented in the layout, the system further comprising logic to utilize the names when assigning alarms to the objects. The monitor devices may apply sensors to overlapping subareas of the area and cooperatively monitor the area. Each monitor device may be configured to detect a presence of other monitor devices in the area. The layout logic may homologize the images from the monitor devices by applying a camera perspective of each monitor device to correlate objects represented in the images. The layout logic may identify the person in the images and to apply the person as a reference point for the layout. The layout logic may identify a distinctive object in the images and apply the distinctive object as a reference point for the layout. The analytical logic may analyze the layout and training signals for gestures by the person indicative of subareas of the area comprising transitions between sub areas to be monitored by the monitor devices. The monitor devices may cooperatively determine a strategy for monitoring the area.

Description

A monitor unit (device) is described that provides boundary protection without wiring. Particular items (as opposed to just boundaries) may be protected. The monitor devices and system provides a mechanism for synchronization of multi-room security. The monitors, when formed into a system, can be trained to monitor certain areas, and to ignore others. The system trains efficiently and is efficient to configure. Mechanisms are provided for biometric check-in and check-out.

The unit provides features and functionality previously available only through disparate uncoordinated devices, resulting in new emergent features and enabling new features unavailable in pre-cursor solutions. The system is redundant and resilient with no single point of failure. It cannot be disabled/bypassed at a single window, door, or other point of entry. A unit may be configured to enforce positive and negative "geo-fencing" conditions. Areas may be configured for priority attention and data processing, or for less or no monitoring resources of a unit. A unit may be configured to monitor any object in an area, not just doors and windows. It may track the position/movement of physical objects and alert to particular changes in an object's location or status.

Because the unit does not require a sensor installed at each door or window that is being monitored, it can easily be reconfigured to monitor additional locations or new locations. The unit can detect not only entries at monitored doors or windows, but can detect any incursion across a defined boundary, which may be the boundaries of a room, or can be fully configurable boundaries. The unit may be trained to ignore spurious movements (e.g., movements outside of windows, or for instance balloons that are floating or companion animals which would trigger false alarms with traditional motion sensors). The unit be configured using voice input, gestures, or other human inputs. Drone (self-mobilizing) units may be trained to provide roaming intermittent coverage of multiple different areas. Multiple monitor units can cover a single space, providing backup capabilities to one another, and preventing a single point of failure, and preventing single points of bypass. Unlike existing systems requiring passcode entry for arming/disarming, the system can use a broad range of control inputs, including passcodes, voice recognition, face recognition, image recognition, and combinations of these.

In one embodiment, a smoke-alarm-sized unit includes an integrated smoke sensor, a heat sensor, a microphone, multiple stereo cameras (potentially up to four, pointing North-South-East-West), a motion detector, a base speaker, a magnetometer, and multiple LEDs.

The unit also includes a WiFi access point with a backhaul channel implemented over power transmission wires, or via a WiFi "mesh" (peer-to-peer with other co-located WiFi devices, and wirelessly terminating at a modem, phone line, cable line, or other wired transmission media).

The unit may be A/C powered or powered using rechargeable batteries. Some units may include a cellular radio as a back-up communication source if a primary communication media fails due to a power or service outage, or due to tampering.

The monitor may replace an existing smoke alarm, and may be installed in a location with wide room optical visibility. The unit may provide a customizable case, enabling the installation of custom veneers/covers. The unit is designed to be easily replaced.

The unit may be used in a stand-alone mode or in a multi-unit cooperative mode. In the stand-alone mode, the unit is "booted" (initialized, for example powered on or put into a re-initialization sequence while powered on). After the unit boots, it inputs environment information from its various sensors, particularly the camera(s). The unit analyzes the environment information to determine if the environment is familiar, or if it is an unfamiliar environment, or if there have been changes to the environment since the unit was last active. For example, a unit analysis of camera inputs may determine that the environment includes unfamiliar geometry or unfamiliar objects. In one embodiment, the unit may determine room layout based on the proximity of objects in one or more captured images. The room layout may be communicated to a website in some implementations. This may be useful, for instance, for training the unit, as further described.

A "drone" is a unit having roaming (physical motion) capabilities. For example, a drone may comprise the monitoring and training functionality described herein for stationary units, and further include the ability to move between different defined monitoring areas (e.g., rooms) using motor functions. The drone may move from area to area, and within each area, function as does a stationary unit does. Thus a drone may be configured in a manner similar to a stationary device, but with configuration information (e.g., trained layouts) for multiple areas. Drone mobilization to different areas may occur according to a programmed schedule, or autonomously as the drone seeks out motion, noises, or other events configured into the drone to trigger inspection. Additionally, a drone may be configured to take action (e.g., move) in response to an alert raised by the system. The drone can navigate to an area associated with the detected event, for instance, and provide additional monitoring at that location.

Training

Two training modes may be supported: direct, and web layout.

In web layout mode, a person may view a posted area layout (one or more photos, 3D models, or other data representations of the special configuration and object occupancy of the area) on a website to which the layout is communicated by an installed unit. The person may name the layout; naming information may be communicated back to the unit, so that the layout may then be referenced to the unit using the given name. A training process may involve the person walking the room and using gestures to indicate key security points for the unit to monitor, such as doors, windows, and vents. The person may also indicate key objects or features to monitor for changes (e.g., valuable items such as portable computers, objects of art, or televisions). The person may also use voice commands to supplement or in place of motion and gestures. In addition to key security points, the person may indicate areas to ignore (i.e., places in the area where the unit will deliberately de-allocate monitoring/analysis resources during operation).

In direct mode, gestures, motion, or voice commands of the training person may be communicated to the unit in real time. In web layout mode, such training actions are combined with the layout information posted by the unit on the website. In the latter case, the enhanced layout information may be communicated from the website back to the posting unit.

In either mode, the training process may commence with a unit capturing a representation of the scene around it, i.e. it records image and possible other sensor inputs for the area. The unit analyzes the scene information to determine if the scene is familiar, or if it is an unfamiliar scene, or if there have been changes to the scene since the unit was last active. For example, an analysis of camera inputs may determine that the scene includes unfamiliar geometry or unfamiliar objects. This process also occurs if the device is moved to a new room or location.

In one embodiment, a unit may derive an area layout based on the proximity of objects determined from its camera imagery and/or proximity sensor data (such as sonar). The device may post this layout data to an accompanying web service in some implementations (layout training mode).

A user then trains the device on the layout. Training may occur directly or via a website. With a website, the person may view a posted layout that was communicated by an installed device. The person may name the layout; naming information may be communicated back to the unit, so that the layout may now be referenced to the unit using the given name. The person may also indicate, via gesture, voice, motion, or using touch sensor, keyboard, mouse, or other device inputs, objects or features to monitor for changes (e.g., valuable items such as portable computers, objects of art, or televisions). In addition to security points, the person may indicate areas to ignore (i.e., places in the area where the unit will deliberately de-allocate monitoring/analysis resources during operation). The person may give friendly names to objects, walls, etc. which may be later utilized by the unit during alarming, status updates, or other communication as to the area monitored.

In direct mode, the training process may involve the person walking the area and using gestures to indicate security points to monitor, such as doors, windows, and vents. The person may also indicate objects or features to monitor for changes (e.g., valuable items such as portable computers, objects of art, or televisions). The person may also use voice commands to supplement or in place of motion and gestures.

Combinations of website and direct training may be utilized.

Multiple units may be located in a single area (each unit can sense at least a part of the area also available to the sensors of the other unit(s)) and may be configured to cooperatively monitor the area. During new scene processing (training), each unit detects the presence of additional units within its sensor range, using for instance LED/UV/IR/RF or wire-line (e.g., power-line) signaling. The area layout as sensed by multiple devices may be homologized into a single layout at a central location and the central layout communicated back to the devices (before or after user training input to the layout). The layout may be homologized by applying each unit camera and perspective to correlate objects represented in different views. A person may act as a reference point during training, standing in a place visible to all devices, and indicating with a gesture or voice command to synchronize imagery at this spot. With this known reference point, the scenes can then be correlated. A distinctive object can be recognized in the scenes seen by all devices and used as a reference point, for instance an unusual piece of art, or a unique piece of furniture.

Multiple units configured to have multiple areas of (possibly overlapping) monitoring responsibility may cooperatively operate and communicate. During the training process, a person may optionally identify transitions between the different areas to be monitored by the multiple units. The multiple units may then cooperatively determine a best strategy for monitoring the multiple areas, alerting, and for detecting and processing events that transition between the areas.

Alerts may be configured. Configuration information may include events that trigger the alert, how an alert is to be communicated, and to which network or other machine addresses. For instance, alerts may be configured to be local to the unit, in the form of emitted audio. Alerts may also be communicated via email, text message, voice message, instant message, via IP/FTP to a webpage, via RSS, or using other known communication technologies. The tone and volume of a local audio alert may be configurable. Different sounds may be associated with different events (e.g., smoke is one sound/volume, CO2 another). Non-priority alerts such as low battery conditions may be configured to be delivered only under certain conditions or absence of conditions (e.g., not at night). The unit may be configured to direct audio alerts (e.g., using BlueTooth or other short-range wireless technology, or using wire-line media) to visual displays or audio speakers in the area being monitored, or in another area.

Alerts may be configurable as to what triggers the alert. Any sensor input or combination of inputs may cause an alert. For instance, movement, smoke, heat, change in location of an object, proximity of a person, arrival of a known person, arrival of an unknown person may all cause alerts.

A configuration interface may be defined for users or third-party businesses to define or extend alerts. Alert definitions and routing information for alerts may be defined at a central location, for example in a "cloud service". A learning and improvement system for alerts may be centrally defined as well.

Operation

The unit may, during operation, monitor the room in accordance with the enhanced layout. The unit may sense entry and exit to identified areas, or substantial changes in contents of the area, with monitoring and analysis resources allocated preferentially to the key security points in the enhanced layout, and away from the areas that are identified to be ignored or de-prioritized. The unit may perform data logging for defined events, such as a time, text summary, identity information, and video/image/sound captures for entry and exit events, or for detected re-arrangement or removal of identified items of interest.

The device may perform biometric recognition of any entering people using face/voice recognition or other biometric recognition. If alerting is active, the device will raise the appropriate alert for events (see alert section below)

In addition to activity in the room and changes to physical configuration, the unit may also monitor other environmental conditions, such as availability of primary power sources, the charge level of batteries or capacitors used for power or backup power, smoke content, temperature conditions, the presence of fire or water, or CO2 concentration. The unit may be configured to send alerts via its backhaul connection in the event of activity, changes, or environmental conditions that meet certain defined conditions (e.g., which are identified as "unauthorized" or which exceed defined safe threshold values). Alerts or logged information may be posted to the same or a different website than used for enhancing the area layout (i.e., training). Alerts may be provided via email, text messages, or instant messaging logic applications to a configured person's smart phone, computer, automobile dashboard, etc. Live streaming of video feeds from the unit's camera(s) may also be provided to the web site.

Monitoring/alert events may be homologized before being communicated to their defined targets (people to be alerted).

The units may operate to communicate over a backhaul, or with one another, using WiFi, BlueTooth, Ethernet, Zigbee, Zwave, RFID, or other available communication technologies and media.

In one embodiment, a monitor device is packaged as an A/C electrical switch-box sized unit, which can be installed in an existing electrical switchbox. In other embodiments the monitor may be integrated into a television or other appliance having an integrated video camera. Some embodiments may package the monitor as a light-bulb shaped unit which may be installed in a light socket. Drone units may utilize rolling propulsion or for instance a flying "quadcopter" motion system.

Drawings

Figure 2:
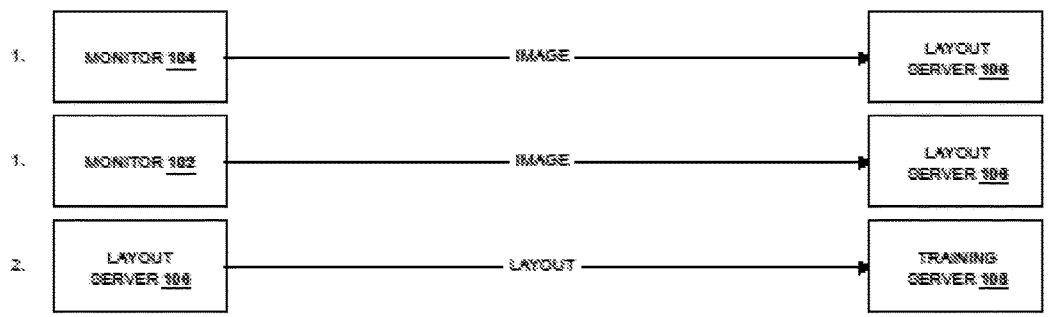
FIG. 2 is an action flow diagram of an embodiment of a versatile monitoring system process.
Figure 3:
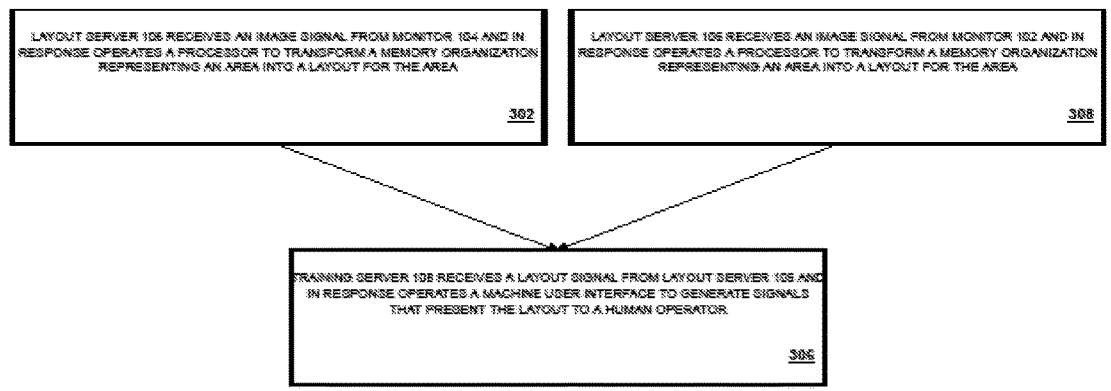
FIG. 3 is a flow chart of an embodiment of a versatile monitoring system process.

FIG. 1 is a system diagram of an embodiment of a versatile monitoring system. FIG. 2 is an action flow diagram of an embodiment of a versatile monitoring system process. FIG. 3 is a flow chart of an embodiment of a versatile monitoring system process.

The system comprises monitor devices 102, 104, a layout server 106, and a training server. The monitors 102, 104 communicate image signals to the layout server 106, which forms a layout that is communicated to a training server 108 (e.g., a web server). The layout server 106 receives an image signal from monitor 104 and in response operates a processor to transform a memory organization representing an area into a layout for the area. Likewise, the layout server 106 receives an image signal from monitor 102 and in response operates a processor to transform the memory organization representing an area into a layout for the area. Examples of image transformation are forming a panorama or 3D model. The training server 108 receives the layout signal from layout server 106 and in response operates a machine user interface to generate signals that present the layout to a human operator. At this point training may begin on the layout, using gestures and/or voice commands by a person that is either remote from or within the area.

Figure 4:
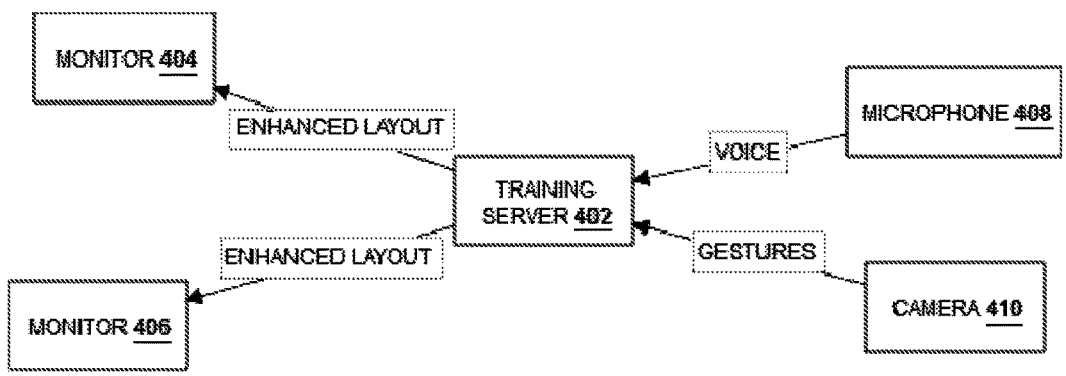
FIG. 4 is a system diagram of an embodiment of a versatile monitoring system.
Figure 5:
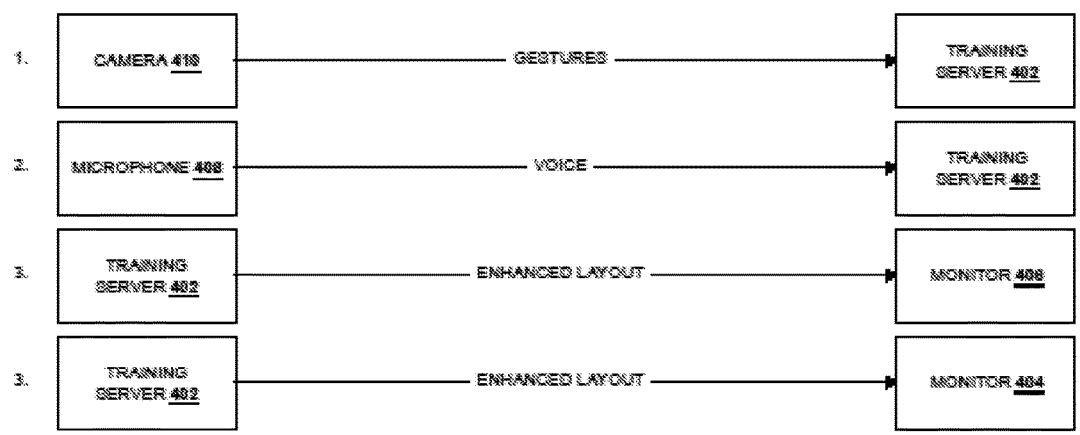
FIG. 5 is an action flow diagram of an embodiment of a versatile monitoring system process.
Figure 6:
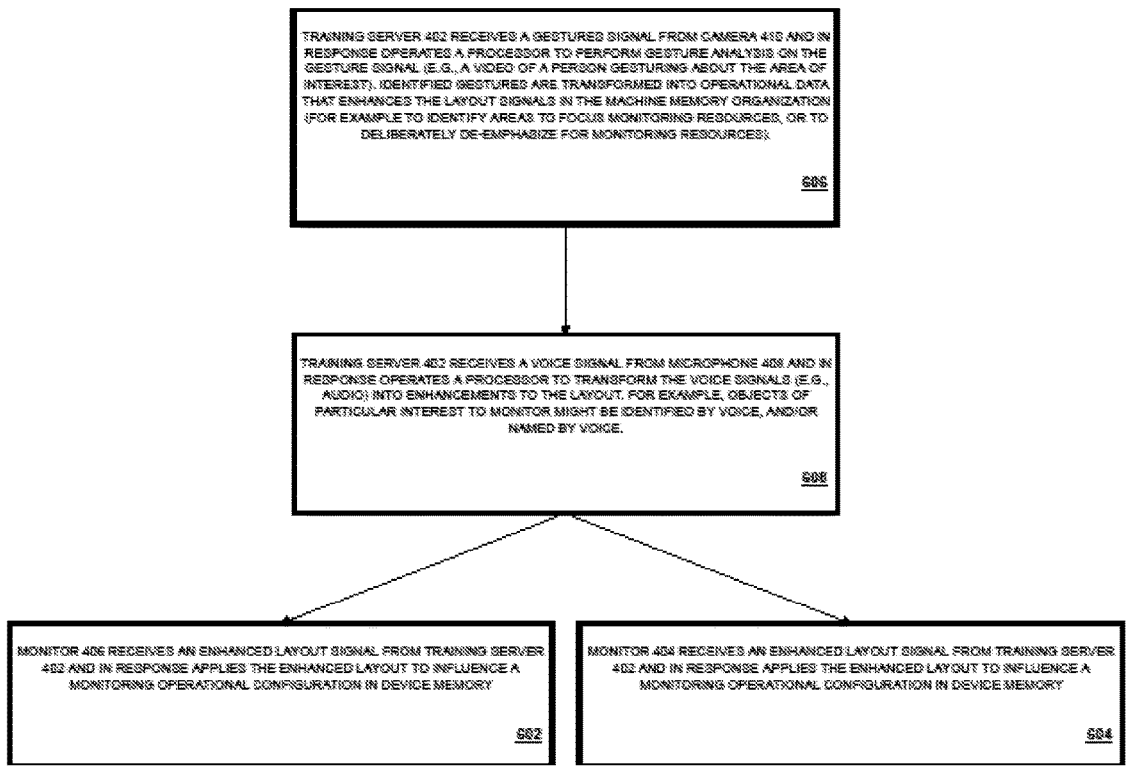
FIG. 6 is a flow chart of an embodiment of a versatile monitoring system process.

FIG. 4 is a system diagram of an embodiment of a versatile monitoring system. FIG. 5 is an action flow diagram of an embodiment of a versatile monitoring system process. FIG. 6 is a flow chart of an embodiment of a versatile monitoring system process. The system comprises monitors 404, 406 (similar or the same as 102, 104), training server 402 (similar or same as 108), microphone 408, and camera 410. The training server 402 receives a gestures signal from camera 410 and in response operates a processor to perform gesture analysis on the gesture signal (e.g., a video of a person gesturing about the area of interest). Identified gestures are transformed into operational data that enhances the layout signals in the machine memory organization (for example to identify areas to focus monitoring resources, or to deliberately de-emphasize for monitoring resources). The training server 402 receives a voice signal from microphone 408 and in response operates a processor to transform the voice signals (e.g., audio) into enhancements to the layout. For example, objects of particular interest to monitor might be identified by voice, and/or named by voice. The monitor 406 receives an enhanced layout signal from training server 402 and in response applies the enhanced layout to influence a monitoring operational configuration in device memory. The monitor 404 receives the enhanced layout signal from training server 402 and in response applies the enhanced layout to influence a monitoring operational configuration in device memory.

Figure 7:
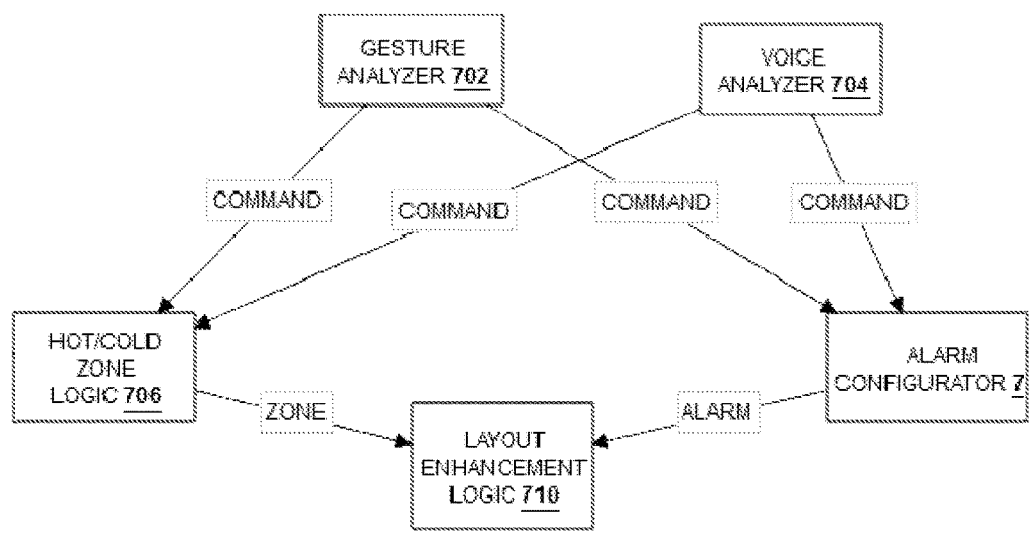
FIG. 7 is a system diagram of an embodiment of a versatile monitoring system.
Figure 8:
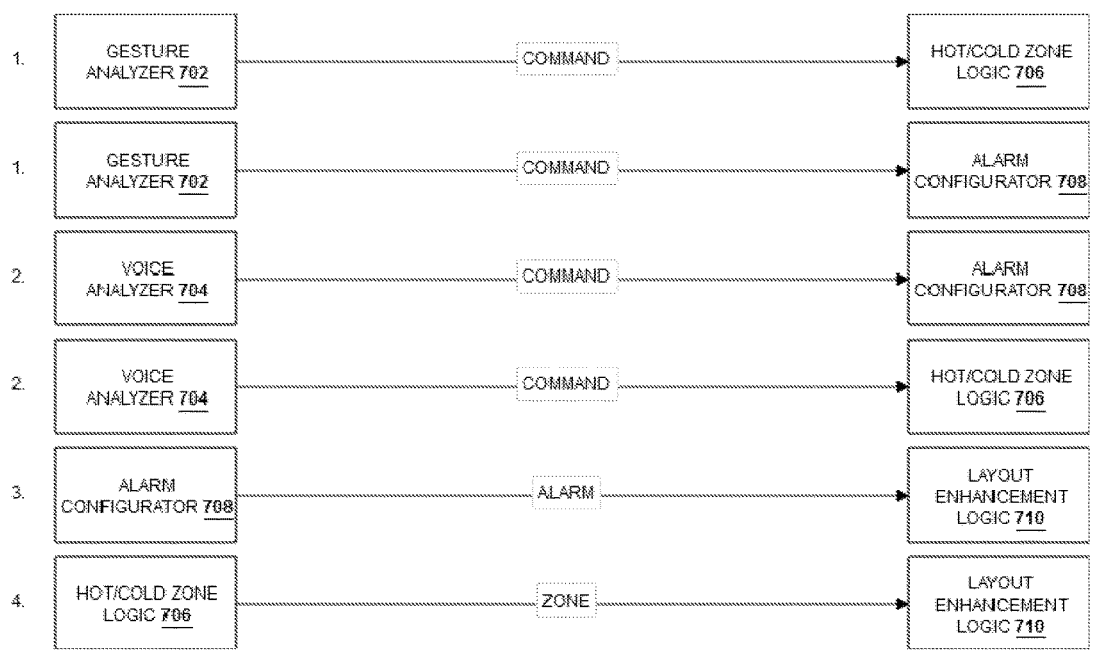
FIG. 8 is an action flow diagram of an embodiment of a versatile monitoring system process.
Figure 9:
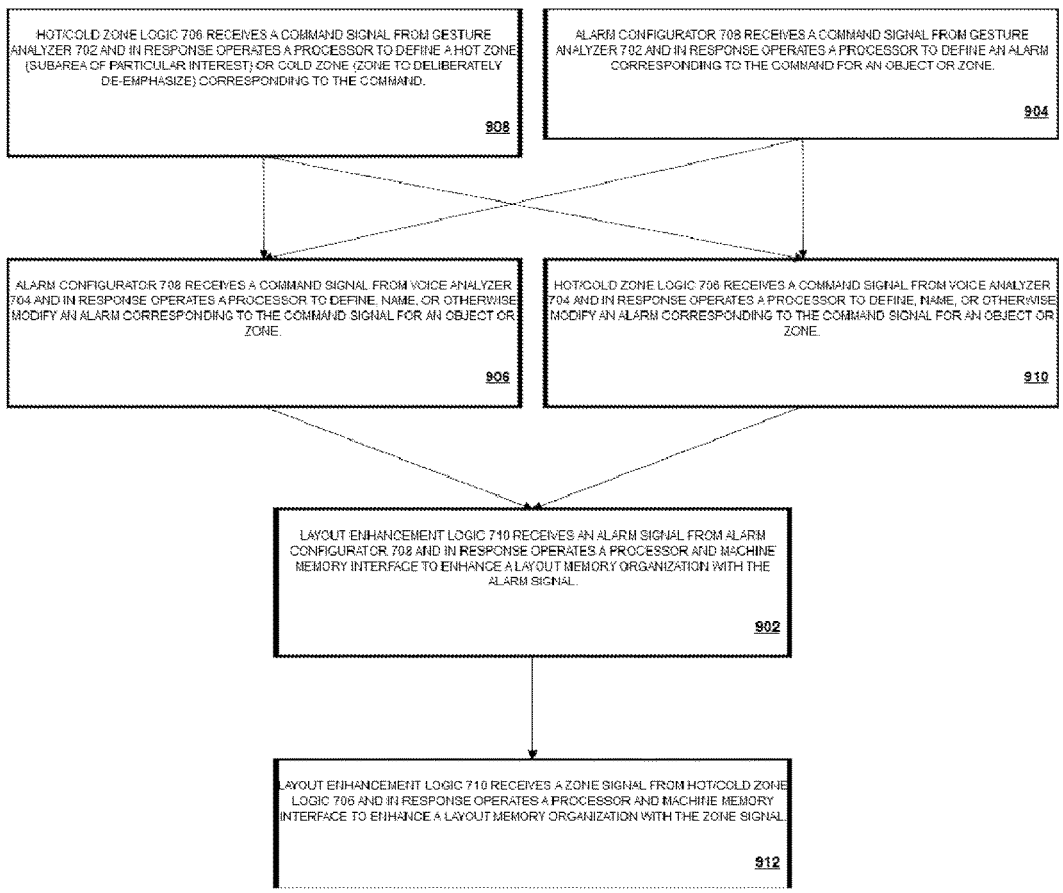
FIG. 9 is a flow chart of an embodiment of a versatile monitoring system process.

FIG. 7 is a system diagram of an embodiment of a versatile monitoring system. FIG. 8 is an action flow diagram of an embodiment of a versatile monitoring system process. FIG. 9 is a flow chart of an embodiment of a versatile monitoring system process. The hot/cold zone logic 706 receives a command signal from gesture analyzer 702 and in response operates a processor to define a hot zone (subarea of particular interest) or cold zone (zone to deliberately de-emphasize) corresponding to the command. In this fashion, zones or objects in the layout to emphasize for monitoring, or to de-emphasize, may be defined by gestures by a co-located or remote person. The alarm configurator 708 receives a command signal from gesture analyzer 702 and in response operates a processor to define an alarm corresponding to the command for an object or zone. In this way, gestures by the person may also be used to indicate alarm conditions or areas to be alarmed in the layout. The alarm configurator 708 receives a command signal from voice analyzer 704 and in response operates a processor to define, name, or otherwise modify an alarm corresponding to the command signal for an object or zone. The hot/cold zone logic 706 receives a command signal from voice analyzer 704 and in response operates a processor to define, name, or otherwise modify a subarea corresponding to the command signal for an object or zone. Thus, voice signals from the person may be utilized to enhance the layout. The layout enhancement logic 710 receives an alarm signal from alarm configurator 708 and in response operates a processor and machine memory interface to enhance a layout memory organization with the alarm signal. layout enhancement logic 710 receives a zone signal from hot/cold zone logic 706 and in response operates a processor and machine memory interface to enhance a layout memory organization with the zone signal.

Figure 10:
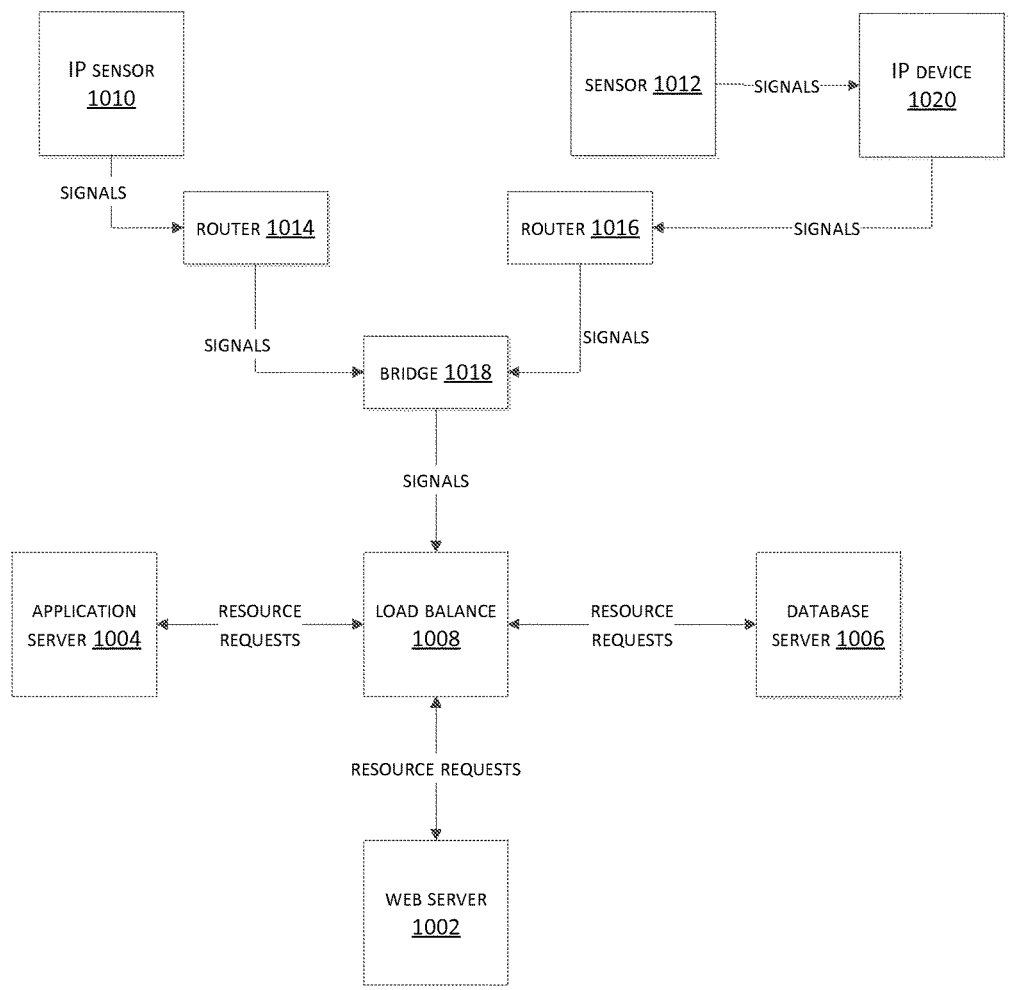
FIG. 10 illustrates a machine network embodiment for implementing a versatile monitoring system.

FIG. 10 illustrates a machine network embodiment for implementing a versatile monitoring system. An IP sensor 1010 (e.g., a camera, microphone, CO2 sensor, heat sensor, smoke sensor) responds to a physical stimulus from the environment with output signals that represent the physical stimulus. The signal is output in Internet Protocol (IP) format (for example), and propagated via a router 1014 and a bridge 1018 to a server system. Another sensor 1012 does not have IP protocol capability and so outputs signals in a different (e.g., analog or non-IP digital) format to an IP-enabled device 1020 which converts the signals output by the sensor 1012 into an IP protocol and communicates them via a router 1016 and bridge 1018 to the server system. The server system inn this example comprises a number of separate server devices, typically each implemented in the separated machine, although this is not necessarily the case. The signals from the sensors are provided via a load balancing server 1008 to one or more application server 1004 and one or more database server 1016. Load balancing server 1008 maintains an even load distribution to the other server, including web server 1002, application server 1004, and database server 1006. In one implementation of a versatile monitor network, the application server 1004 may implement one or both of a layout server and a training server, and the database server 1006 may implement a storage system for layouts, training information, gesture patterns, voice commands, and other signals utilized in the system. Each server in the drawing may represent in effect multiple servers of that type. The signals from the sensors 1010, 1012 influence one or more processors of the application server 1004 to carry out various transformations of signals such as, for example, images, voice, and gestures. Database server 1006 may provide signals in response to resource requests indicative of stored layouts and other commands. The signals applied to the database server 1006 may cause the database server 1006 to access and certain memory addresses, which correlates to certain rows and columns in a memory device. These signals from the database server 1006 may also be applied to application server 1004 via the load balancing server 1008. The system may supply signals to the web server 1002, which in turn converts the signals to resources available via the Internet or other WAN by devices of the system (e.g., monitor devices).

Figure 11:
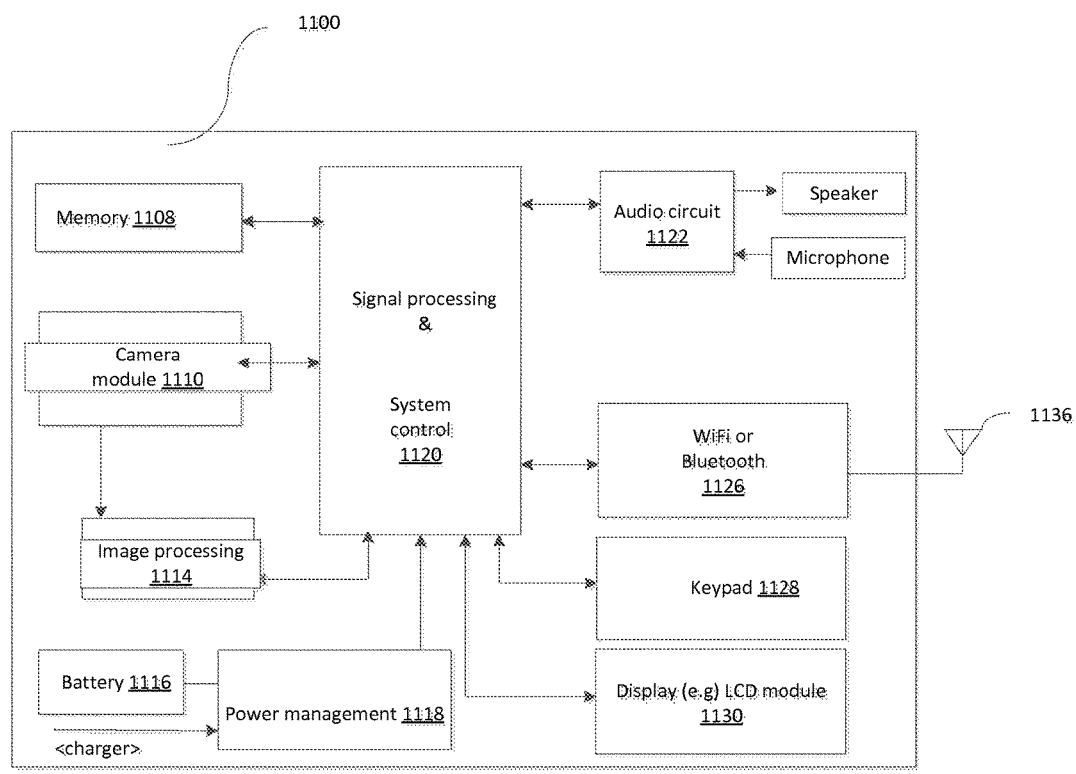
FIG. 11 illustrates an embodiment of a versatile monitoring device.

FIG. 11 illustrates an embodiment of a versatile monitoring device. Logic 1120 provides device system control over other components and coordination between those components as well as signal processing for the device. Signal processing and system control logic 1120 extracts baseband signals from the radio frequency signals (e.g., WiFi) received by the device, and processes baseband signals up to radio frequency signals for communications transmitted from the device. Logic 1120 may comprise a central processing unit, digital signal processor, and/or one or more controllers or combinations above these components. The device may further comprise memory 1108 which may be utilized by the central processors, digital signal processors in controllers of the systems logic 1120.

A camera module 1110 may interface to a camera device to capture images and video from the environment. These images and video may be provided to an image processing module 1114 for enhancement, compression, and other processing, and from there to the central control logic 420 for further processing and storage to memory 1108 or communication to another device (e.g., a layout server or training server) over a machine network.

Images, video and other display information, for example, user interface optical patterns, may be output to a display module 1130 which may for example operate as a liquid crystal display or may utilize other optical output technology. The display module 1130 may also operate as a user input device, being touch sensitive where contact or close contact by a use's finger or other device handled by the user may be detected by transducers. An area of contact or proximity to the display module 1130 may also be detected by transducers and this information may be supplied to the control logic 1120 to affect the internal operation of the device 1100 and to influence control and operation of its various components.

Audio signals may be provided to an audio circuit 1122 from which signals output to one and more speakers to create pressure waves in the external environment representing the audio.

The mobile device 1100 may operate on power received from a battery 1116. The battery capability and energy supply may be managed by a power management module 1118.

Another user interface device operated by control logic 1120 is a keypad 1128 which responds to pressure or contact events by a user of the device. As noted the keypad may in some cases be implemented by transducers of the display module 1130.

The mobile device 1100 may generate short range wireless signals to influence other devices in its proximity, and may receive wireless signals from those proximate devices using antenna 1136. Short range radio signals may influence the device, or be generated by the device for output to the environment, through a BlueTooth or WiFi module 1126. Other forms of electromagnetic radiation may be used to interact with proximate devices, such as infrared (not illustrated).

The mobile device 1100 may convert audio phenomenon from the environment into internal electro or optical signals by using microphone and the audio circuit 1122.

Figure 12:
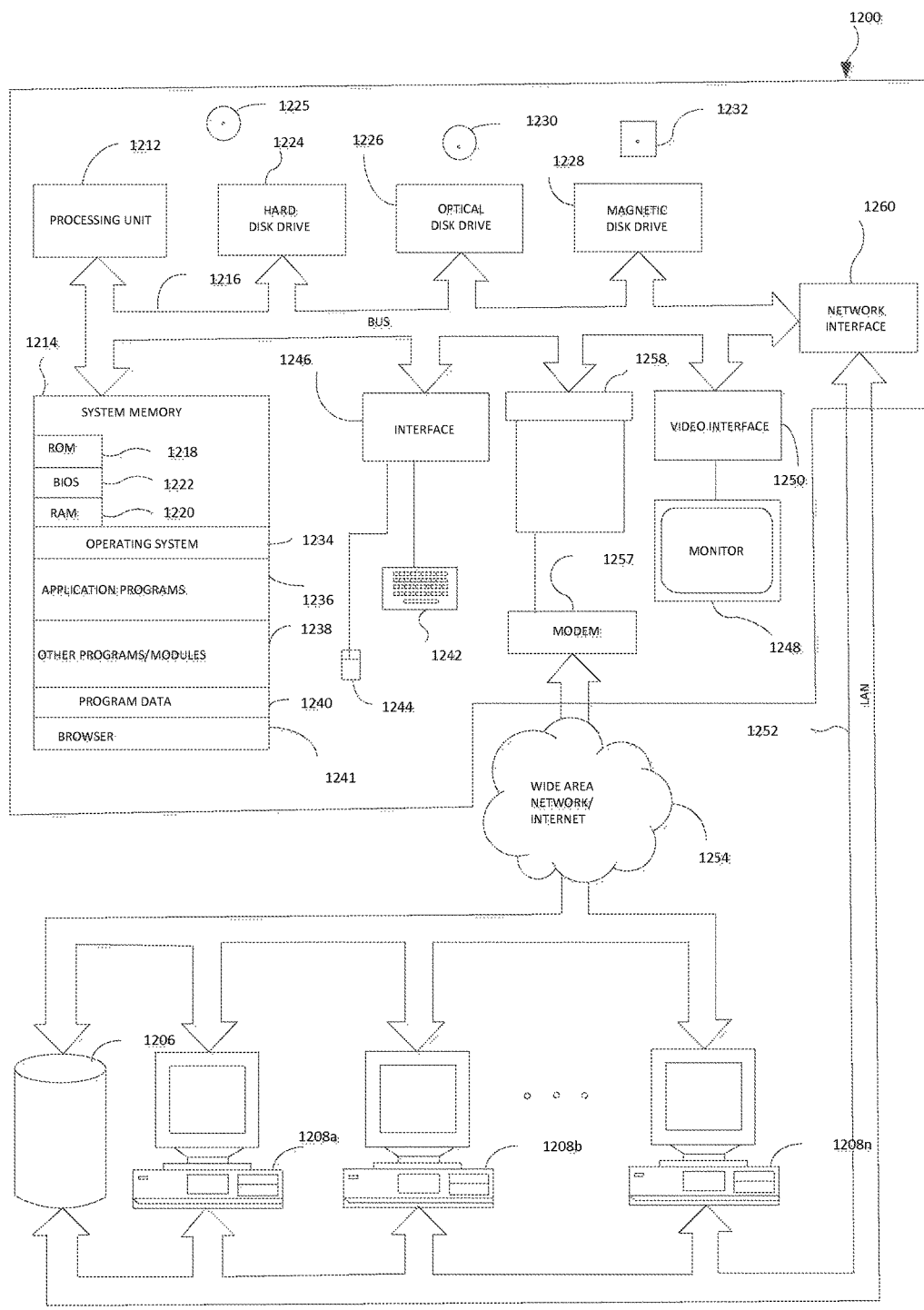
FIG. 12 illustrates an embodiment of a computer system to implement aspects of a versatile monitoring system, such as a layout server, training server, or various logic modules described herein (e.g., gesture analyzer, alarm configurator, hot/cold zone logic, etc.).

FIG. 12 illustrates an embodiment of a computer system to implement aspects of a versatile monitoring system, such as a layout server, training server, or various logic modules described herein (e.g., gesture analyzer, alarm configurator, hot/cold zone logic, etc.). A particular computer system 1200 of the machine network may include one or more processing units 1212, a system memory 1214 and a system bus 1216 that couples various system components including the system memory 1214 to the processing units 1212. The processing units 1212 may be any logic processing unit, such as one or more central processing units (CPUs), digital signal processors (DSPs, application-specific integrated circuits (ASICs), field programmable gate arrays (FPGAs), etc. The system bus 1216 can employ any known bus structures or architectures, including a memory bus with memory controller, a peripheral bus, and a local bus. The system memory 1214 includes read-only memory (ROM) 1218 and random access memory (RAM) 1220. A basic input/output system (BIOS) 1222, which can form part of the ROM 1218, contains basic routines that help transfer information between elements within the computer system 1200, such as during start-up.

The computer system 1200 may also include a plurality of interfaces such as network interface 1260, interface 1258 supporting modem 1257 or any other wireless/wired interfaces.

The computer system 1200 may include a hard disk drive 1224 for reading from and writing to a hard disk 1225, an optical disk drive 1226 for reading from and writing to removable optical disks 1230, and/or a magnetic disk drive 1228 for reading from and writing to magnetic disks 1232. The optical disk 1230 can be a CD-ROM, while the magnetic disk 1232 can be a magnetic floppy disk or diskette. The hard disk drive 1224, optical disk drive 1226 and magnetic disk drive 1228 may communicate with the processing unit 1212 via the system bus 1216. The hard disk drive 1224, optical disk drive 1226 and magnetic disk drive 1228 may include interfaces or controllers (not shown) coupled between such drives and the system bus 1216, as is known by those skilled in the relevant art. The drives 1224, 1226 and 1228, and their associated computer-readable storage media 1225, 1230, 1232, may provide non-volatile and non-transitory storage of computer readable instructions, data structures, program modules and other data for the computer system 1200. Although the depicted computer system 1200 is illustrated employing a hard disk 1224, optical disk 1226 and magnetic disk 1228, those skilled in the relevant art will appreciate that other types of computer-readable storage media that can store data accessible by a computer may be employed, such as magnetic cassettes, flash memory, digital video disks (DVD), Bernoulli cartridges, RAMs, ROMs, smart cards, etc. For example, computer-readable storage media may include, but is not limited to, random access memory (RAM), read-only memory (ROM), electrically erasable programmable read-only memory (EEPROM), flash memory, compact disc ROM (CD-ROM), digital versatile disks (DVD) or other optical disk storage, magnetic cassettes, magnetic tape, magnetic disk storage or other magnetic storage devices, solid state memory or any other medium which can be used to store the desired information and which may be accessed by processing unit 1212.

Program modules can be stored in the system memory 1214, such as an operating system 1234, one or more application programs 1236, other programs or modules 1238 and program data 1240. Application programs 1236 may include instructions that cause the processor(s) 1212 to automatically provide dynamic selection of data and telecommunication service providers before or during communications between various devices such as, for example, a mobile device and a landline telephone. Other program modules 1238 may include instructions for handling security such as password or other access protection and communications encryption. The system memory 1214 may also include communications programs, for example, a Web client or browser 1241 for permitting the computer system 1200 to access and exchange data with sources such as Web sites of the Internet, corporate intranets, extranets, or other networks and devices as described herein, as well as other server applications on server computing systems. The browser 1241 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. A number of Web clients or browsers are commercially available such as those from Mozilla, Google, and Microsoft.

Although illustrated as being stored in the system memory 1214, the operating system 1234, application programs 1236, other programs/modules 1238, program data 1240 and browser 1241 can be stored on the hard disk 1225 of the hard disk drive 1224, the optical disk 1230 of the optical disk drive 1226 and/or the magnetic disk 1232 of the magnetic disk drive 1228.

An operator can enter commands and information into the computer system 1200 through input devices such as a touch screen or keyboard 1242 and/or a pointing device such as a mouse 1244, and/or via a graphical user interface. Other input devices can include a microphone, joystick, game pad, tablet, scanner, etc. These and other input devices are connected to one or more of the processing units 1212 through an interface 1246 such as a serial port interface that couples to the system bus 1216, although other interfaces such as a parallel port, a game port or a wireless interface or a universal serial bus (USB) can be used. A monitor 1248 or other display device is coupled to the system bus 1216 via a video interface 1250, such as a video adapter. The computer system 1200 can include other output devices, such as speakers, printers, etc.

The computer system 1200 can operate in a networked environment using logical connections to one or more remote computers and/or devices. For example, the computer system 1200 can operate in a networked environment using logical connections to one or more mobile devices, landline telephones and other service providers or information servers. Communications may be via a wired and/or wireless network architecture, for instance wired and wireless enterprise-wide computer networks, intranets, extranets, telecommunications networks, cellular networks, paging networks, and other mobile networks. Communication may take place between the computer system 1200 and external devices via a WAN 1254 or LAN 1252. External devices may include other computer system 1208a-n (collectively, 1208) and external storage devices 1206.

Implementations and Alternatives

The techniques and procedures described herein may be implemented via logic distributed in one or more computing devices. The particular distribution and choice of logic may vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A machine system, comprising:
   a plurality of monitor devices each comprising a camera, the monitor devices distributed over a physical area;
   layout logic configured to form images from the cameras of the monitor devices into a scene layout for the area;
   user interface logic configured to receive training signals from sensors directed to a person physically present in the area and to correlate those signals to subareas of the layout; and
   analytical logic configured to analyze the layout and training signals to ascertain subareas of the area at which the monitor devices should focus machine sensor and processing resources, and to analyze the layout to determine if the area corresponds to an existing stored layout.

2. The machine system of claim 1, the user interface logic configured to receive training signals from the sensors representing indications by the person of movable objects to monitor for changes.

3. The machine system of claim 2, the analytical logic configured to analyze the layout and training signals for gestures by the person indicative of movable objects to monitor for changes.

4. The machine system of claim 1, the user interface logic configured to receive training signals from the sensors representing voice commands by the person that indicate information to associate with the subareas.

5. The machine system of claim 1, the analytical logic configured to analyze the layout and training signals to ascertain subareas of the area at which the monitor devices should deliberately avoid focusing machine sensor and processing resources.

6. The machine system of claim 5, the analytical logic configured to analyze the layout and training signals for gestures by the person indicative of subareas of the area at which the monitor devices should deliberately avoid focusing machine sensor and processing resources.

7. The machine system of claim 1, the analytical logic configured to analyze the layout to determine if an area corresponding to an existing scene layout includes unfamiliar geometry or unfamiliar objects.

8. The machine system of claim 1, the analytical logic configured to analyze the layout each time a monitor device is moved to a new area to determine if the area corresponds to an existing stored layout.

9. The machine system of claim 1, the user interface logic configured to receive from the person names to objects represented in the layout, the system further comprising logic to utilize the names when assigning alarms to the objects.

10. The system of claim 1, wherein the plurality of monitor devices apply sensors to overlapping subareas of the area and are configured to cooperatively monitor the area.

11. The system of claim 10, each monitor device configured to detect a presence of other monitor devices in the area.

12. The system of claim 1, the layout logic configured to homologized the images from the monitor devices by applying a camera perspective of each monitor device to correlate objects represented in the images.

13. The system of claim 12, the layout logic configured to identify the person in the images and to apply the person as a reference point for the layout.

14. The system of claim 12, the layout logic configured to identify a distinctive object in the images and to apply the distinctive object as a reference point for the layout.

15. The system of claim 1, the analytical logic configured to analyze the layout and training signals for gestures by the person indicative of subareas of the area comprising transitions between sub areas to be monitored by the monitor devices.

16. The system of claim 1, the monitor devices cooperatively determining a strategy for monitoring the area.

17. The machine system of claim 2, the analytical logic configured to analyze the layout and training signals for gestures by the person indicative of movable objects to monitor for changes.

* * * * *